(No Model.) 2 Sheets—Sheet 1.

J. McCLOSKEY.
EXPANSION DEVICE.

No. 398,526. Patented Feb. 26, 1889.

WITNESSES.
J. M. Hartnett.
B. M. Williams

INVENTOR.
John McCloskey
By his Atty.
Henry W. Williams (No Model.) 2 Sheets—Sheet 2.

J. McCLOSKEY.
EXPANSION DEVICE.

No. 398,526. Patented Feb. 26, 1889.

WITNESSES. INVENTOR.
J. M. Hartnett. John McCloskey
B. W. Williams By his Atty.
Henry W. Williams

UNITED STATES PATENT OFFICE.

JOHN McCLOSKEY, OF BOSTON, MASSACHUSETTS, ASSIGNOR OF ONE-HALF TO CHARLES F. FARWELL, OF SAME PLACE.

EXPANSION DEVICE.

SPECIFICATION forming part of Letters Patent No. 398,526, dated February 26, 1889.

Application filed August 25, 1888. Serial No. 283,701. (No model.)

*To all whom it may concern:*

Be it known that I, JOHN McCLOSKEY, of Boston, in the county of Suffolk and State of Massachusetts, have invented a new and Improved Expansion Device, of which the following is a specification.

My invention consists of a tube somewhat flattened and bent or formed into the shape of a series of reverse C curves or springs, as below described. This may be used in various connections where it is desired to convert force or pressure into motion. For example, it may be filled with any of the hydrocarbons—such as rhigoline, naphtha, gasoline, &c., any of which are highly expansible by application of heat—and after having been sealed tightly, in any manner desired, will elongate from the expansive pressure generated within said tube upon the application of heat. This it is enabled to do by the shape of said convolutions or reverse C curves in said tube. Upon the removal of the force or pressure the spring or power of the material of which the tube is made may cause said tube to return or contract to its original length, thus converting force into reciprocating motion, or said tube may be made to return to its original length by means of a counter-pressure acting upon the outside thereof.

Heat may be applied to the device in any desired manner, such as in the shape of a naked flame or by radiation, steam, electricity, hot air, &c.

Figure 1:
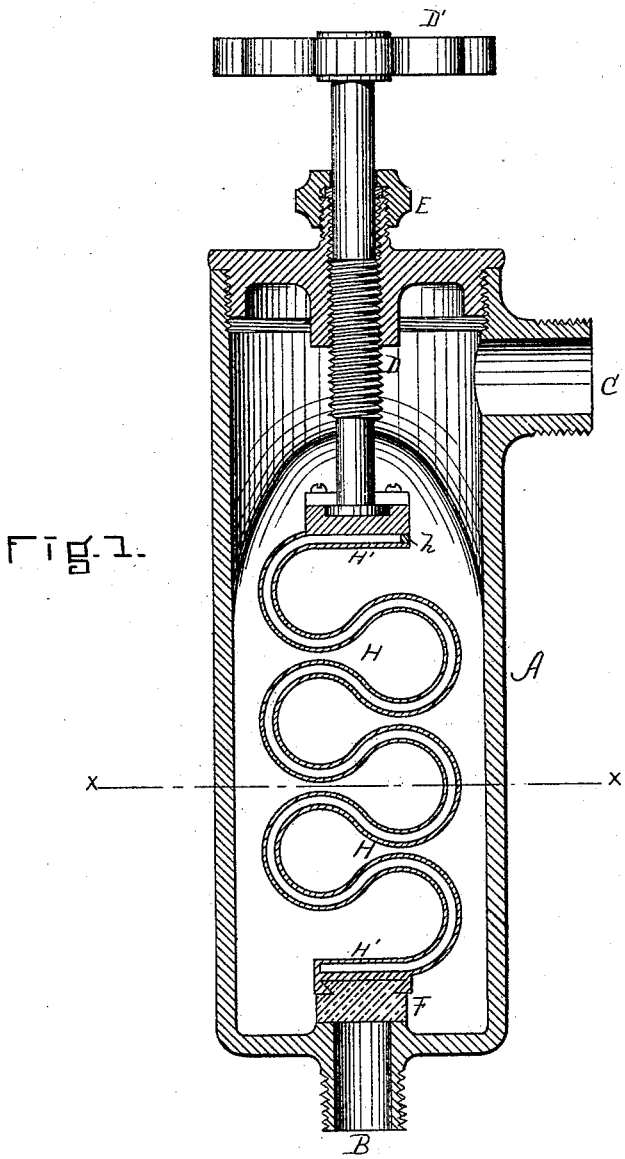
Figure 2:
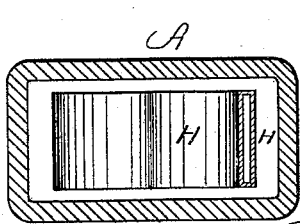
Figures 3, 4:
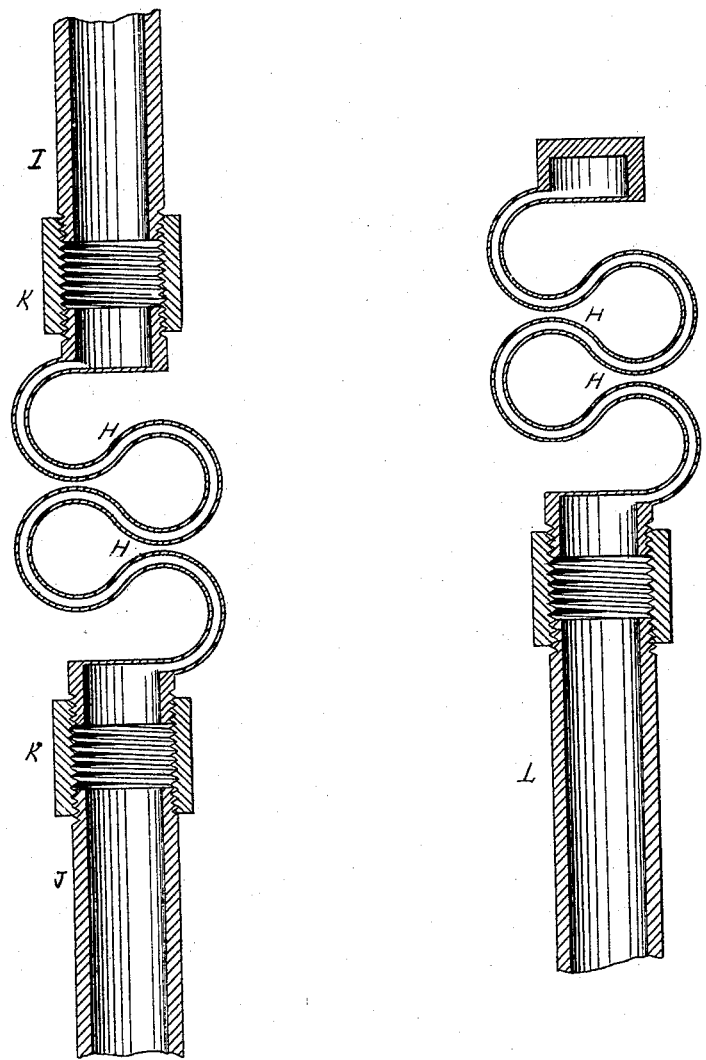

In the accompanying drawings, in which similar letters of reference indicate like parts, Figure 1 represents a longitudinal section of a steam-regulator valve provided with my device. Fig. 2 is a cross-section of the same on line *x*, Fig. 1. Fig. 3 is a longitudinal section of my device applied to a steam-tight joint. Fig. 4 is a longitudinal section of the device placed on the end of a pipe.

In Figs. 1 and 2, A is the casing. B is the inlet-tube; C, the outlet-tube; D, the regulating-screw turned by the hand-wheel D'; E, the stuffing-box, and F the valve upon the valve-seat, all constructed as usual and making no part of the invention. H is a flattened tube, formed into a series of exactly reverse C curves or springs. This tube is to be filled with any desirable liquid, preference being given, of course, to those that are highly expansible by the application of heat. The tube is provided with one or more inlets for the admission of the liquid, said inlets being preferably near the ends of said tube, and being provided with suitable sealing-stoppers, as *h*, whereby any possibility of leakage is prevented. Any well-known liquid-tight sealing device may be employed in place of the simple stopper shown in the drawings. Now by applying heat to this tube in any manner, whether in the form of steam, electricity, or other substance, the tube will expand by the pressure or stretching of the C curves or springs in exactly a longitudinal line—that is, a line which in the drawings is central and longitudinal with the casing A—so that if the valve F, which is secured to the lower end of the tube, were raised from its seat and steam let in through the port B the tube, whose upper end is secured to the lower end of the regulating-screw D, would expand or elongate and force the valve down upon its seat, while as the temperature within the tube lowered it would contract and the valve be lifted from its seat, letting in more steam.

In Fig. 3, I and J are steam-pipes, and K K the collar forming the joint cut into two parts to allow the application of my tube H. In this case the tube is open at both ends to allow the passage of the steam, and is practically an expansion-joint, the movement whereby the tube is elongated and contracted being derived from the contraction and elongation of the pipes I J.

In Fig. 3 the tube is secured to the end of a pipe, L, and is closed at its free or outer end. Elongation of the tube H by the application of heat—say to the contents of the pipe L—produces motion at the free closed end of said tube H.

I do not claim as new a tube bent into a series of curves merely. The curves shown in my tube are C-shaped and reverse—*i. e.*, each bend or curve is of the shape of an arc of a circle greater than a half-circle, (which is what I intend to convey by " C-shaped,") and in each bend are portions of two other arcs reversed, which when completed form the greater part of the next bends or convolutions. By this means, and because in each convolution there are no straight portions, but only true arcs, each more than half a circle, the expansion or lengthening of the tube is not only greatly increased, but the bending and strain of the convolutions are distributed as the tube is lengthened by the application of heat.

There are many positions and places in which my peculiarly-shaped tube may be put; but wherever the device is placed, and in whatever manner force is applied, the same result is obtained—viz., longitudinal expansion or straightening of the tube, whereby the ends are forced away from each other on a line drawn longitudinally through the series of C-shaped curves or springs and intersecting each.

Any desirable material, whether metallic or otherwise, may be used in the construction of the tube.

I am aware that a tubular C-spring is not new in itself considered, the Bourdon spring being of such a description; but the expansion of such a spring is not in a straight line, as is the case with my double-reverse C-springs, forming a continuous tube.

Having thus fully described my invention, what I claim, and desire to secure by Letters Patent, is—

1. The herein-described expansion device, consisting of a substantially flattened tube bent or formed into a series of reverse C curves or springs—i. e., arcs comprehending more than semicircles—whereby longitudinal expansion or lengthening of said series forming the tube may be obtained, substantially as set forth.

2. The herein-described expansion device, consisting of a tube closed at its ends and bent or formed into a series of reverse C curves or springs—i. e., arcs comprehending more than semicircles—said tube containing liquid, whereby by the application of heat longitudinal expansion or lengthening of said series forming the tube may be obtained, substantially as described.

JOHN McCLOSKEY.

Witnesses:
HENRY W. WILLIAMS,
J. M. HARTNETT.